Jan. 1, 1929.

G. G. GILPIN 1,696,910

END DOOR FOR AUTOMOBILE CARS

Original Filed Jan. 6, 1926   2 Sheets-Sheet 1

Inventor:
Garth G. Gilpin
Vinton E. Sisson.
Attorney

Jan. 1, 1929.
G. G. GILPIN
1,696,910
END DOOR FOR AUTOMOBILE CARS
Original Filed Jan. 6, 1926    2 Sheets-Sheet 2
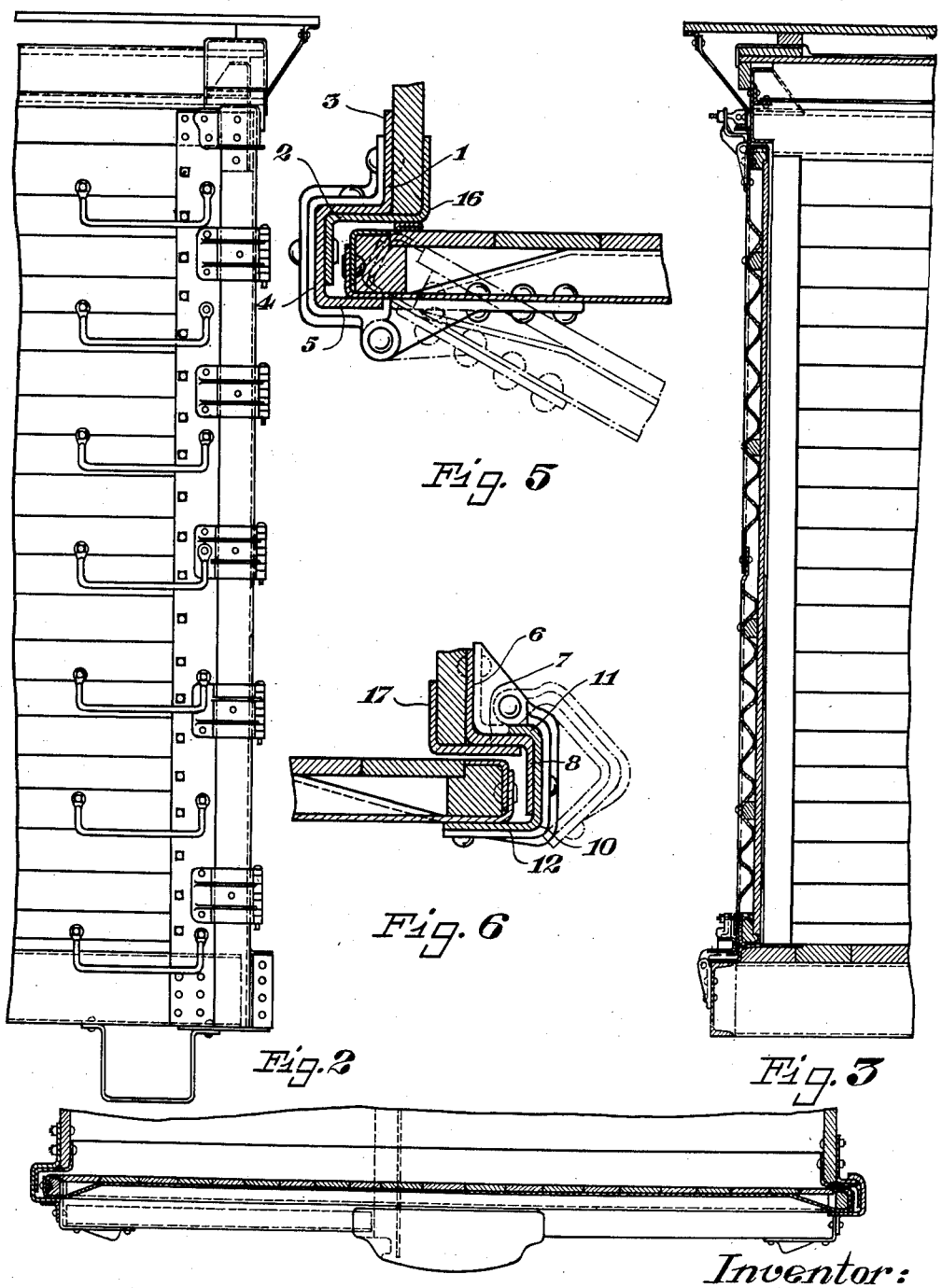
Inventor:
Garth G. Gilpin
Vinton E. Sisson.
Attorney Patented Jan. 1, 1929.

1,696,910

UNITED STATES PATENT OFFICE.

GARTH G. GILPIN, OF RIVERSIDE, ILLINOIS, ASSIGNOR TO UNION METAL PRODUCTS COMPANY, OF CHICAGO, ILLINOIS, A CORPORATION OF DELAWARE.

END DOOR FOR AUTOMOBILE CARS.

Original application filed January 6, 1926, Serial No. 79,554. Divided and this application filed April 12, 1926. Serial No. 101,416.

This invention relates to large railway box cars known as automobile cars having one of their end walls arranged to be opened to facilitate the loading or unloading of automotive cars and trucks or the like. Such an arrangement materially weakens the car framing and it is difficult to design the end framing of such a car, the attachment of the car door and the door itself so as to resist the weaving stresses of the car in service and the shifting cargo, and at the same time obtain a door which is easy to operate, weatherproof and burglarproof. Automobile cars are used in general service so must be capable of carrying various types of lading.

In my arrangement the corner post, end plate and end sill are securely fastened together to form a rigid frame and a single swinging door is provided to retain the cargo, which door must transmit the static as well as quiescent loads of the cargo to the frame.

The single door is hinged along one vertical side to a corner post or frame member of the car and when closed its opposite side is adjacent the opposite corner post, and in my arrangement the joints between the door and the respective corner posts are not only waterproof and burglarproof, but by my particular construction any load imposed on the inside of the door is transmitted to the corner posts independent of the hinges or locking means. Independent means are also provided to retain the door in the closed position at its upper and lower part.

In the drawings:

Fig. 2 is a fragmentary side elevation of Fig. 1.

Fig. 3 is a section on line 3—3 of Fig. 1.

Fig. 4 is a section on line 4—4 of Fig. 1.

Fig. 5 is an enlarged section on line 5—5 of Fig. 1.

Fig. 6 is an enlarged section on line 6—6 of Fig. 1.

Figure 1:
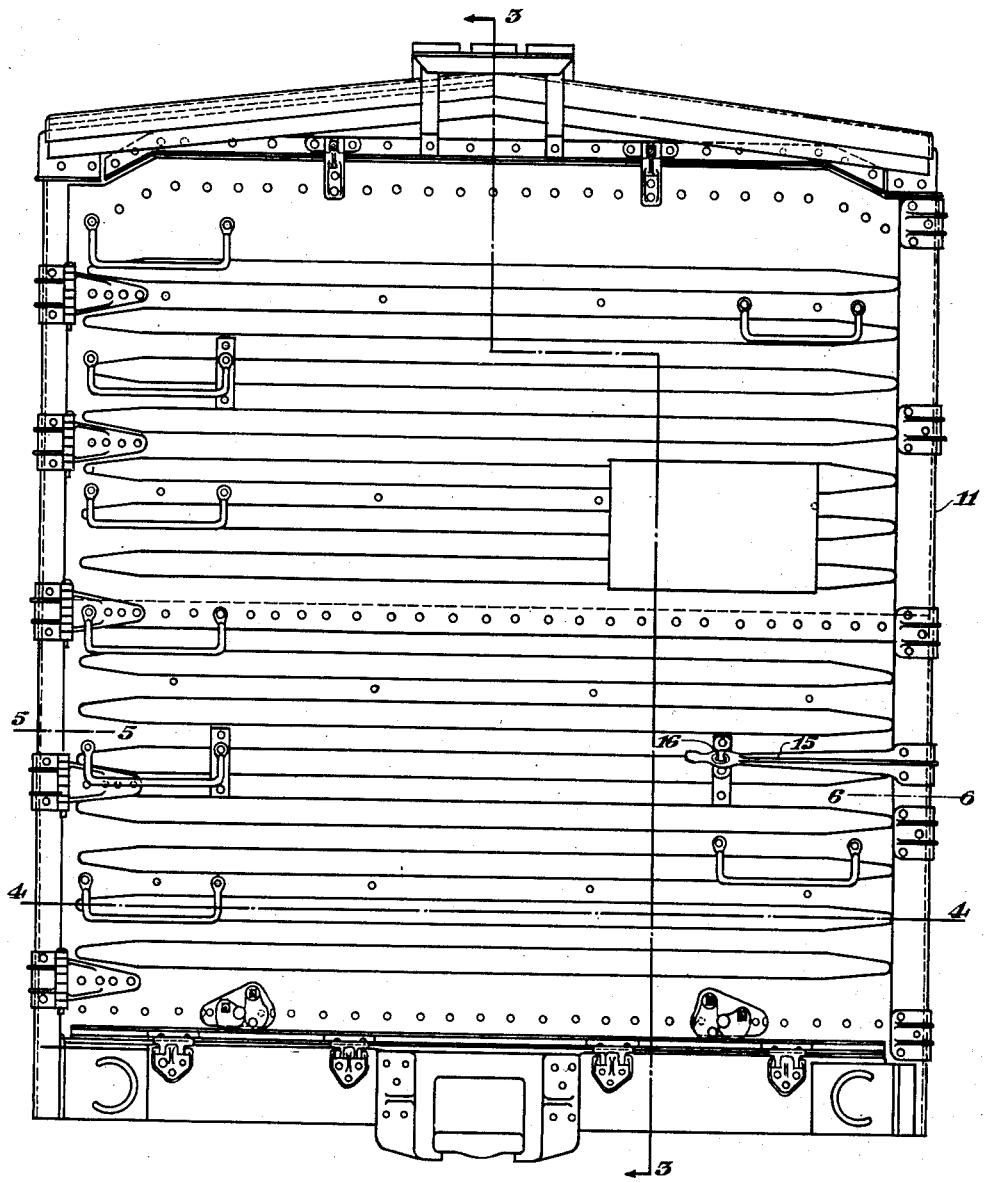
Fig. 1 is an end elevation of a railway box car with my device applied thereon.

The corner post of a railway box car is a part of the side retaining wall of the car, and as such must resist horizontal stresses; furthermore, it is the end strut of the side truss of the car, and as such, must act as a column. The ordinary rigid end wall of a box car reinforces the corner post to perform both of these functions, but as there is no rigid end wall in the door end of an automobile car, the corner post must be designed to resist these stresses, that is, to act as a vertical beam and as a column. The corner post 1 to which the door is hinged comprises a main portion 2, a rearwardly extending flange 3, a forwardly extending web 4 and an inwardly extending flange 5. The main portion 2 is a beam of considerable strength to resist lateral stresses and is reinforced to resist such stresses by the rearwardly extending flange 3 and the forwardly extending web 4, which members form a Z-section. This Z-section is also a strut of considerable strength and acts as a column. The web 4, with the portion 2, and the flange 5, may be described as a U-shaped member with a long and a short arm.

The door is hinged to the corner post 1 (or side wall of the car) so that a portion of it will swing behind the flange 5 and preferably engage or contact with it. The hinges are designed to permit horizontal movement between their component parts (so-called a loose hinge) so that any load imposed upon the inside of the door is received by the corner post independently of the hinges. The closed and open position of the door and its relative position to the corner post, hinge and other associated parts is shown in Fig. 5.

When the door is in closed position the side furthest from the hinges is adjacent the corner post or jamb 6, which is similar to the post heretofore described and comprises the outwardly projecting web on part 7 and flange 8. A retaining strip 10 is hinged to the jamb 6 so that when the door is in locked position a portion 11 of the strip engages the outwardly projecting part 7 of the jamb and another portion 12 of the strip engages the outside of the door. The hinges are designed to permit horizontal movement between their component parts so that any horizontal load imposed upon the inside of the door is transmitted by the retaining strip to the jamb independently of the locking means and the retaining strip hinges. The retaining strip and its relative position to the corner post, hinge and other associated parts, when the door is locked or unlocked is shown in Fig. 6. This retaining strip preferably extends substantially the full height of the door. The lever arm 15 is rigidly secured to the retaining strip 10 to forcibly close the door, which lever arm may be provided with means 16 to lock it in a predetermined position. Auxiliary posts 16—17 are provided to reinforce the door posts respectively.

The door is made of one or more metallic plates secured together and formed with integral corrugations or other reinforcing means which extend continuously from adjacent the corner post 1 at the hinged side of the door to the retaining strip 10 at the opposite side of the door. These corrugations reinforce the entire area of the door against which the cargo is thrust to resist buckling and deflection. Such corrugations are beams and transmit the loads imposed upon them to the corner post and retaining strip, respectively, adjacent their opposite extremities.

Certain features herein shown are disclosed and claimed in my co-pending application Serial No. 67,921, filed November 9, 1925.

The accompanying drawings illustrate the preferred form of the invention, though it is to be understood that the invention is not limited to the exact details of construction shown and described, as it is obvious that various modifications thereof within the scope of the claims will occur to persons skilled in the art.

This is a division of my co-pending application Serial No. 79,554, filed January 6, 1926 which is a division of application Serial No. 67,921, filed November 9, 1925.

I claim:

1. In a railway car, the combination of a swinging door, a jamb having an outwardly projecting part, and a retaining strip hinged to said jamb so that when the door is in closed position a portion of said strip engages said part and another portion thereof engages the outside of said door.

2. In a railway car, the combination of a swinging door, a jamb having an outwardly projecting part, a retaining strip hinged to said jamb so that when the door is in closed position a portion of said strip engages said part and another portion thereof engages the outside of the door, a lever arm secured to said retaining strip for forcibly closing the door, and means to lock said lever in a predetermined position.

3. In a railway car, the combination of a swinging door, a jamb attached to the side wall of the car with an arm projecting outwardly, and a double flanged retaining strip hinged to said jamb so that when the door is in locked position one flange engages said arm and the other flange engages the outside of the door.

4. In a railway car, the combination of a swinging door, a jamb having an outwardly projecting part, and a retaining strip hinged to said jamb so that when the door is in closed position a portion of said strip engages said part and another portion thereof engages the outside of the door, said strip extending substantially the full height of the door.

GARTH G. GILPIN.